(12) United States Patent
Holdcroft et al.

(10) Patent No.: US 6,765,027 B2
(45) Date of Patent: Jul. 20, 2004

(54) ION-EXCHANGE MATERIALS WITH IMPROVED ION CONDUCTIVITY

(75) Inventors: Steven Holdcroft, Pitt Meadows (CA); Jianfu Ding, Ottawa (CA); Carmen Chuy, Burnaby (CA); Charles Stone, West Vancouver (CA); Anne E Morrison, North Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 113 days.

(21) Appl. No.: 10/144,663

(22) Filed: May 13, 2002

(65) Prior Publication Data

US 2003/0078308 A1 Apr. 24, 2003

Related U.S. Application Data

(60) Provisional application No. 60/291,205, filed on May 15, 2001.

(51) Int. Cl.$^7$ .............................. C08J 5/22; H01M 8/10
(52) U.S. Cl. ............................ 521/27; 521/31; 521/33; 525/242; 525/267; 525/326.2; 525/333.3; 525/333.5; 526/73; 526/204; 526/251; 429/33; 429/41; 429/314; 429/316
(58) Field of Search ............................ 521/27, 31, 33; 525/242, 267, 326.2, 333.3, 333.5, 256; 526/73, 204, 251; 429/41, 314, 316, 33

(56) References Cited

U.S. PATENT DOCUMENTS

| | | | | |
|---|---|---|---|---|
| 4,012,303 A | * | 3/1977 | D'Agostino et al. | 521/27 |
| 4,605,685 A | | 8/1986 | Momose et al. | 522/124 |
| 5,322,912 A | | 6/1994 | Georges et al. | 526/204 |
| 5,328,956 A | | 7/1994 | Hasebe et al. | 525/64 |
| 5,449,724 A | | 9/1995 | Moffat et al. | 526/204 |
| 5,610,250 A | * | 3/1997 | Veregin et al. | 526/204 X |
| 6,100,331 A | | 8/2000 | Teshima | 525/76 |
| 6,156,858 A | * | 12/2000 | Keoshkerian et al. | 526/204 |
| 6,365,675 B1 | * | 4/2002 | MacLeod et al. | 525/256 |

FOREIGN PATENT DOCUMENTS

WO   WO 00/22684   4/2000

OTHER PUBLICATIONS

Bouix et al., "Synthesis of Amphiphilic Polyelectrolyte Block Copolymers using "Living" Radical Polymerization. Application as Stabilizers in Emulsion Polymerization," *Macromol. Rapid Commun.* 19:209–213, 1998.

Maniruzzaman et al., "Micellar Copolymerization of Styrene with Poly(Ethylene Oxide) Macromonomer in Water: Approach to Unimolecular Nanoparticles Via Pseudo–Living Radical Polymerization," *Macromolecules* 33:1583–1592, 2000.

Jiang et al., Chemical Abstracts Service, Database Accession No. 136:135085, 2001.

Weiss et al., "Miscible Blends of a Thermotropic Liquid Crystalline Polymer and Sulfonated Polystyrene Ionomers," *Polymer* 41:3471–3477, 2000.

Boehm, "Some Aspects Of The Surface Chemistry Of Carbon Blacks And Other Carbons," *Carbon* 32(5):759–769, 1994.

Gabaston et al., "Direct synthesis of Novel Acidic And Zwitterionic Block Copolymers Via TEMPO–Mediated Living Free–Radical Polymerization," *Polymer* 40:4505–4514, Sep. 1999.

He et al., "Rate Enhancement of Nitroxide–Mediated Living free–Radical Polymerization By Continuous Addition of Initiator," *Polymer* 41:4573–4577, 2000.

Reed and Brodd, "Porous Carbon For Fuel Cell Electrodes," *Carbon* 3:241–246, Jan. 1965.

Rodriguez–Reinoso, "The Role of Carbon Materials In Heterogeneous Catalysis," *Carbon* 36(3):159–175, 1998.

* cited by examiner

*Primary Examiner*—Fred Teskin
(74) *Attorney, Agent, or Firm*—Seed IP Law Group PLLC (57) ABSTRACT

Ion-exchange materials comprising a polymeric backbone and a plurality of pendent styrenic or fluoridated styrenic macromonomers covalently bonded thereto, wherein the plurality of pendent styrenic or fluorinated styrenic macromonomers comprise a uniform number of styrenic or fluoridated styrenic monomer repeat units, and wherein predominantly all of the styrenic or fluoridated styrenic monomer repeat units have at least one charged group. Processes for making such material, as well as products related thereto, are also disclosed. In a representative embodiment, the ion-exchange material is utilized as a proton-exchange membrane (PEM) for use in a PEM fuel cell.

46 Claims, 5 Drawing Sheets

ION-EXCHANGE MATERIALS WITH IMPROVED ION CONDUCTIVITY

CROSS-REFERENCE TO RELATED APPLICATION

This application claims the benefit of U.S. Provisional Application No. 60/291,205, filed May 15, 2001, now pending, which application is incorporated herein by reference in its entirety.

BACKGROUND OF THE INVENTION

1. Field of the Invention

This invention generally relates to ion-exchange materials and, more particularly, to ion-exchange materials that are useful as electrolytes for electrochemical fuel cells.

2. Description of the Related Art

Ion-exchange materials are useful over a broad range of applications, and may generally be categorized as either anion- or cation-exchange materials. Such materials have been used in fields such as chromatography, catalysis, electrochemical processes, the creation of super acids and super bases, and for the separation, concentration and/or purification of ionic species. One important application of ion-exchange materials is their use as electrolytes in electrochemical fuel cells. In this application, the electrolyte commonly conducts protons and thus may be characterized as a cation-exchange material. Such cation-exchange materials typically constitute an organic polymer having acidic functional groups attached thereto. The acidic functional groups, in turn, comprise corresponding cations, which, in the context of fuel cell electrolytes, are more commonly protons. When the electrolyte is in the form of a membrane, the ion-exchange material is often referred to as a proton-exchange membrane or "PEM," and fuel cells incorporating such a membrane are referred to as PEM fuel cells. Cation-exchange materials may also be incorporated into PEM fuel cells in other forms, for example, as components in the catalyst layers or as electrode coatings.

In general terms, an electrochemical fuel cell converts a fuel (such as hydrogen or methanol) and oxygen into electricity and water. Fundamental components of PEM fuel cells include two electrodes—the anode and cathode—separated by the PEM. Each electrode is coated on one side with a thin layer of catalyst, with the PEM being "sandwiched" between the two electrodes and in contact with the catalyst layers. Alternatively, one or both sides of the PEM may be coated with a catalyst layer, and the catalyzed PEM is sandwiched between a pair of porous electrically conductive electrode substrates. The anode/PEM/cathode combination is referred to as a membrane electrode assembly or "MEA." Hydrogen fuel dissociates into electrons and protons upon contact with the catalyst on the anode-side of the MEA. The protons migrate through the PEM, while the free electrons are conducted from the anode, in the form of usable electric current, through an external circuit to the cathode. Upon contact with the catalyst on the cathode-side of the MEA, oxygen, electrons from the external circuit, and protons that pass through the PEM combine to form water.

Desirable characteristics of a PEM include good mechanical properties, high conductivity, resistance to oxidative and thermal degradation, and dimensional stability upon hydration and dehydration. A variety of materials have been developed with these characteristics in mind, including perfluorinated sulfonic acid aliphatic polymers such as those described in U.S. Pat. Nos. 3,282,875 and 4,330,654. One example is a product sold by DuPont under the trade name Nafion®. This material has been used effectively in PEM fuel cells due to its acceptable proton conductivity, as well as its mechanical and chemical characteristics. More specifically, Nafion is a polytetrafluoroethylene-based ionomer containing sulfonic acid groups to provide proton conductivity.

A variety of aromatic-based polymers for PEMs have also been investigated; such as films made from sulfonated poly-$\alpha,\beta,\beta$-trifluorostyrene. However, these membranes have unfavorable mechanical properties when wet and become brittle when dry (see *Russian Chemical Reviews* 59:583, 1988). Some improvement is realized when poly-$\alpha,\beta,\beta$-trifluorostyrene is blended with polyvinylidene fluoride and triethylphosphate plasticizer. However, the blended material is still not satisfactory for use as PEMs in fuel cells (*Fuel Cell Handbook*, A. J. Appleby, published by Van Nostrand Reinhold, p. 286, 1989).

Polymers with more favorable mechanical properties have been derived from copolymerization of $\alpha,\beta,\beta$-trifluorostyrene with a variety of substituted $\alpha,\beta,\beta$-trifluorostyrenes, as described by U.S. Pat. No. 5,422,411. Substituents in this context include alkyl, halogen, $C_yF_{2y+1}$, OR (where R is alkyl, perfluoroalkyl, aryl), $CF=CF_2$, CN, $NO_2$, OH, and sulfonyl fluoride. Such copolymers may be prepared via an emulsion-free radical polymerization, followed most commonly by reacting with a sulfonating reagent to introduce sulfonic acid functional groups.

Enhanced mechanical strength and dimensional stability have been achieved when PEMs are prepared as composite materials. One approach is to first form the polymer into a membrane and then laminate the membrane to a porous substrate. Another approach is to impregnate the porous substrate with a solution of the polymer. In either case, the substrate imparts desired mechanical properties and dimensional stability. One example of this approach is the impregnation of Gore-tex® (a porous polytetrafluoroethylene) with Nafion as described in *Journal of the Electrochemical Society*, 132, 514–515, 1985. Also, U.S. Pat. No. 5,985,942 describes composite membranes prepared by impregnating a porous substrate with various substituted $\alpha,\beta,\beta$-trifluorostyrene polymers. Another approach to preparing PEMs having good mechanical properties, dimensional stability, and resistance to degradation is to graft functional components onto films having such characteristics. For example, U.S. Pat. No. 4,012,303 describes preparation of a PEM by grafting $\alpha,\beta,\beta$-trifluorostyrene onto a chemically resistant film, followed by sulfonation of the grafted material.

Development efforts directed to PEMs, such as those described above, have largely focused on improving mechanical properties, as well as oxidative and thermal stability. Less effort has been directed towards increasing the conductivity of such membranes, and that effort has been largely focused on the concentration or density and nature of ion-exchange groups incorporated into the polymeric material. Yet for fuel cell applications at least, it is very important that PEMs have high conductivity since commercial feasibility of fuel cells largely hinges on the power density achieved (i.e., electrical power output per unit of stack volume and weight).

Accordingly, there remains a need in the art for improved ion-exchange materials generally and, more particularly, for highly conductive ion-exchange materials useful as electrolytes in PEM fuel cells. The present invention fulfills these needs, and provides further related advantages.

BRIEF SUMMARY OF THE INVENTION

In brief, this invention is directed to highly conductive ion-exchange materials that comprise a polymeric backbone and a plurality of pendent styrenic or fluorinated styrenic macromonomers covalently bonded thereto, wherein the plurality of pendent styrenic or fluorinated styrenic macromonomers comprise a uniform number of styrenic or fluorinated styrenic monomer repeat units, and wherein predominantly all of the styrenic or fluorinated styrenic monomer repeat units have at least one charged group. The charged group may be an acidic group or a basic group or a mixture thereof, or salts thereof.

The ion-exchange material may be formed by a copolymerization reaction between a backbone monomer and the plurality of styrenic or fluorinated styrenic macromonomers. In this case, reactive functionality on the terminal groups of the macromonomer will form part of the backbone, for example, through condensation or free radical polymerization of the macromonomers with other monomers. Further, depending on the nature of the terminal groups of the macromonomers, they may also form the entire backbone in the ion-exchange material, again through, for example, condensation or free radical polymerization reaction. Alternatively, the ion-exchange material may be formed by covalently bonding the plurality of styrenic or fluorinated styrenic macromonomers to an existing backbone, in the form of a bulk polymer or copolymer, comprising reactive sites. Furthermore, in some embodiments, the polymeric backbone may be a porous inorganic polymer, such as, for example, carbon (graphite) or $TiO_2$, to which the macromonomer is grafted, or may be an electron-conducting polymer. Such materials have use, for example, as catalyst support materials.

A method is also disclosed for making a plurality of styrenic or fluorinated styrenic macromonomers having a uniform number of styrenic or fluorinated styrenic monomer repeat units. This method comprises the steps of (1) adding a free radical initiator into a mixture comprising one or more types of styrenic or fluorinated styrenic monomers, a solvent and a stable free radical agent, wherein the mixture is at a first temperature sufficient to form an adduct between a portion of the styrenic or fluorinated styrenic monomers, the free radical initiator and the stable free radical agent; (2) polymerizing the adduct with the styrenic or fluorinated styrenic monomers at a second temperature greater than the first temperature, wherein the second temperature is sufficient to sustain polymerization, and thereby forming the plurality of styrenic or fluorinated styrenic macromonomers having the uniform number of styrenic or fluorinated styrenic monomer repeat units; and (3) adding a reactive end-group to each of the plurality of styrenic or fluorinated styrenic macromonomers having the uniform number of styrenic or fluorinated styrenic monomer repeat units.

In a more specific embodiment, a proton-exchange membrane (PEM) is disclosed comprising an ion-exchange material having a polymeric backbone and a plurality of pendent styrenic or fluorinated styrenic macromonomers covalently bonded thereto, wherein the plurality of pendent styrenic or fluorinated styrenic macromonomers comprise a uniform number of styrenic or fluorinated styrenic monomer repeat units, and wherein predominantly all of the styrenic or fluorinated styrenic monomer repeat units have at least one acidic group. In further embodiments, a membrane electrode assembly (MEA) is disclosed comprising the PEM of this invention, as well as fuel cells containing such an MEA.

These and other aspects of this invention will be evident upon reference to the following detailed description and attached drawings. To this end, a number of articles and patent documents are cited hereinto to aid in understanding certain aspects of this invention. Such documents are hereby incorporated by reference in their entirety.

DETAILED DESCRIPTION OF THE INVENTION

As noted above, this invention is generally directed to ion-exchange materials that have improved ion-conductivity and, in one representative embodiment, to ion-exchange materials useful as electrolytes in PEM fuel cells. In another representative embodiment, this invention is directed to ion-exchange materials useful as catalyst supports. Products and processes related to ion-exchange materials are also disclosed and discussed in greater detail below.

The ion-exchange materials comprise a polymeric backbone with a plurality of pendent styrenic or fluorinated styrenic macromonomers covalently bonded thereto. In turn, the plurality of pendent styrenic or fluorinated styrenic macromonomers comprise styrenic or fluorinated styrenic monomer repeat units, predominantly all of which have at least one charged group—that is, an acidic group or a basic group, or a mixture or salt thereof. For purpose of convenience, styrenic or fluorinated styrenic macromonomers are also referred to herein as "macromonomers," while styrenic or fluorinated styrenic monomers are also referred to herein as "monomers."

For a particular ion-exchange material, the pendent macromonomers are uniform with respect to the number of their monomer repeat units (i.e., their chain length). Styrene monomer (e.g., ethenyl benzene; $C_6H_5CH=CH_2$) is a well-known starting material used in the manufacture of a variety of plastic and synthetic rubber materials. "Fluorinated styrene" monomer, as used herein, has at least one of the ethenyl hydrogen atoms replaced with a fluorine atom. For example, α,β,β-trifluorostyrene ($C_6H_5CF=CF_2$) has all three ethenyl hydrogen atoms replaced with fluorine atoms. Styrene monomer or fluorinated styrene monomer, may have other non-hydrogen substituents on the aromatic ring, and by combination with itself or other vinyl monomers, forms the "styrenic or fluorinated styrenic macromonomers" of this invention. The "monomer repeat units" are that portion of the macromonomer attributable to the corresponding monomer. In the case of styrene, the monomer repeat unit has the following structure (I), and for fluorinated styrene the monomer repeat unit has the following structure (II):

(I)

(II)

wherein $X_1$, $X_2$ and $X_3$ of structure (II) are individually hydrogen or fluorine, and wherein at least one of $X_1$, $X_2$ and $X_3$ is fluorine.

As mentioned above, the styrenic or fluorinated styrenic macromonomers comprise monomer repeat units of the above structures (I) and/or (II). In turn, predominantly all of these monomer repeat units have at least one acidic or basic group (Y) as a substituent of the phenyl ring, as represented by the following structures (I') and (II'):

(I')

(II')

wherein Y represents at least one charged group as defined herein.

In addition, the styrene and fluorinated styrene monomer repeat units may be further substituted on the phenyl ring, the ethylene carbon(s), or both. For example, in either structure (I) or (II), one or more of the ethylene carbon atoms may be substituted with lower alkyl (such as methyl) or lower fluoroalkyl (such as trifluoromethyl). Furthermore, in either structure (I) or (II), the phenyl ring may be further substituted with one or more additional ring substituents such as phenyl, pyridinyl, pyrolyl or furanyl. Lastly, the phenyl ring may be fused to another phenyl ring to form naphthyl, wherein the naphthyl ring is optionally substituted with one or more of the ring substituents as defined above. Thus, as used herein, the phrase "styrenic or fluorinated styrenic monomer repeat units" includes the monomer repeat units of structures (I') and (II') above, as well as substituted derivatives thereof.

A "charged group" is any moiety that contains either a positive or negative charge, or both, and associated counterion(s). In one embodiment, the charged group is an "acidic group." Representative acidic groups include (but are not limited to) $-SO_3H$, $-PO_2H_2$, $-PO_3H_2$, $-CH_2PO_3H_2$, $-OSO_3H$, $-OPO_2H_2$ and $-OPO_3H_2$. In another embodiments, the charged group is a "basic group." Representative basic groups include (but are not limited to) $-NR_2$ and $-PR_2$ (wherein R is alkyl, fluoroalkyl or aryl). Charged groups also include the corresponding anions and cations of the above groups, as well as salt forms thereof.

Ion-exchange materials that contain acidic groups will conduct cations, while ion-exchange materials that contain basic groups will conduct anions. Typically, when used as an electrolyte in a fuel cell, the charged groups are acidic groups and thus conduct protons. For other applications, the charged groups are basic groups, and may be used, for example, to separate, purify or concentrate desired anions.

When referring to the charged groups of the monomer repeat unit, the term "predominantly all" means that a sufficient number of the monomer repeat units have a charged group such that a desired level of ion-conductivity is imparted to the ion-exchange material. For example, when the ion-exchange material is to be used as an electrolyte for a fuel cell, at least 50% of the monomer repeat units have at least one acidic group. In other embodiments, at least 70%, at least 80%, or at least 90%, respectively, of the monomer repeat units have at least one acidic group. In a further embodiment, at least 95% of the monomer repeat units have at least on acidic group, and in one embodiment all (i.e., 100%) of the monomer repeat units have at least one acidic group.

An important aspect of the ion-exchange materials of this invention is that the pendent macromonomers, for a particular ion-exchange material, are uniform with respect to the number of their monomer repeat units. As used herein, "uniform" means that the pendent macromonomers for a particular ion-exchange material have a polydispersity ranging from unity (i.e., 1.0) to 1.4, generally from 1.05 to 1.3, and typically from 1.1 to 1.2. Polydispersity (PD) is defined as the weight average molecular weight ($M_W$) divided by the number average molecular weight ($M_N$) of the chemical species present in a mixture typically comprising different chemical species. Molecular weight, in turn, can be measured by a variety of techniques including, for example, end-group titration, gel permeation chromatography, light scattering, osmometry, sedimentation, small angle neutron scattering and/or viscosity. Since weight average molecular weight is always equal to or greater than number average molecular weight, polydispersity is either equal to or greater than unity. In addition, when the polydispersity of the pendent macromonomers is at unity, then each of the pendent macromonomers shares the same degree of polymerization (DP).

As mentioned above, the ion-exchange material comprises a plurality of pendent macromonomers covalently bonded to the polymeric backbone. The term "macromonomer" refers to a molecule comprising one or more types of styrenic or fluorinated styrenic monomer repeat units covalently bonded to one another. While the macromonomer may comprise other monomer repeat units in addition to the styrenic or fluorinated styrenic monomer repeat units, typically such other monomer repeat units will comprise less than 50% of the repeat units of the macromonomer. In other words, the styrenic or fluorinated styrenic monomer repeat units will comprise 50% or more of the monomer repeat units of the macromonomer. In other embodiments, the styrenic or fluorinated styrenic monomer repeat units will constitute in excess of 70%, in excess of 80%, or in excess of 90%, respectively, of the monomer repeat units. In yet a further embodiment, the monomer repeat units of the macromonomer will all (i.e., 100%) be styrenic or fluorinated styrenic monomer repeat units.

While the pendent styrenic or fluorinated styrenic macromonomers, for a particular ion-exchange material, are uniform with respect to the number of their monomer repeat units, that number may range from about 10 to about 150 from one particular ion-exchange material to another. For example, if the number of monomer repeat units for a given ion-exchange material is 30, then the macromonomer is uniform with respect to the number of monomer repeat units about the number 30. In specific embodiments, the number of monomer repeat units is in the range of 10 to 49, 50 to 99, or 100 to 150, respectively. In one embodiment, the number of monomer repeat units is in the range of 20 to 40.

As for the plurality of pendent macromonomers covalently bonded to the polymeric backbone, the term "plurality" means a number sufficient to impart a desired level of ion-conductivity to the ion-exchange material for a given application. Ion-conductivity may be measured by, for example, impedance spectroscopy as described by Gardner and Anantaraman (J. Electroanal. Chem. 395:67, 1995). For use as an electrolyte for a PEM fuel cell within the temperature range of 20° C. to 200° C., a desired level of ion-conductivity is in excess of 0.02 $\Omega^{-1}cm^{-1}$, commonly in excess of 0.05 $\Omega^{-1}cm^{-1}$, and typically in excess of 0.10 $\Omega^{-1}cm^{-1}$.

The polymeric backbone, to which the pendent styrenic or fluorinated styrenic macromonomers are covalently bonded, is either an organic polymer or copolymer, or an inorganic polymer. As used herein, "pendent" means that there is a covalent bond attaching the macromonomer to the backbone, the point of attachment typically being at or near one end of the macromonomer. The macromonomers may be pendent at any location along the backbone.

In one embodiment, the polymeric backbone is a copolymer formed by the copolymerization of the styrenic or fluorinated styrenic macromonomers with one or more backbone monomers. Representative backbone monomers include (but are not limited to) styrene, fluorinated-styrene, ethylene, maleic anhydride, butadiene, isoprene and others, or substituted analogs thereof. The polymeric backbone may comprise repeat units that include reactive end groups of the macromonomers (as discussed below), as well as one or more of the above monomers. In another embodiment, the polymeric backbone is an organic polymer or copolymer that is prepared as a bulk polymer or copolymer. In this case, the polymeric backbone may be synthesized by polymerization of one or more backbone monomers. Such polymeric backbones may also contain chemical moieties that provide reactive sites for covalent attachment of the pendent macromonomers. In another embodiment terminal groups of the macromonomers can form the entire backbone.

In another embodiment, the polymeric backbone is a porous inorganic polymer such as carbon (graphite) or $TiO_2$. In this regard, "porous" means that the polymeric backbone has pores that range in size from 0.1 to 100 $\mu$m, and more typically from 0.1 to 10 $\mu$m. Carbon can be functionalized to allow for grafting of macromonomers by reacting the surface of the carbon with free radicals such as those derived from 2-isobutyronitrile, 3,5-dichlorobenzoyl peroxide, or lauryl peroxide (Boehrn, Carbon 32:759, 1994). As another example, the surface of graphite can be fluorinated to yield graphite fluoride, which can then reacted with the macromonomers (see, e.g., U.S. Pat. No. 4,557,974). In another embodiment, the polymeric backbone is an electron-conducting organic polymer such as such as polypyrrole or polythiophene.

Where the macromonomers are covalently bonded to the polymeric backbone during synthesis of the backbone by copolymerization, the macromonomers will typically contain a chemically reactive end-group, or reactive terminus, that participates in the copolymerization reaction to form the backbone. To make such reactive end groups, the macromonomer is reacted with, for example, a reactive compound having the structure:

wherein $Z_a$, $Z_b$, $Z_c$, $Z_a'$, $Z_b'$ and $Z_c'$ are the same or different and independently hydrogen or fluorine, with the provisos that at least one of $Z_a$, $Z_b$ or $Z_c$ is fluorine and at least one of $Z_a'$, $Z_b'$ or $Z_c'$ is fluorine;

$W_a$, $W_b$ and $W_c$ are the same or different and independently hydrogen or fluorine; and A and B are the same or different and independently —H, —OH, —COX$_2$, —SO$_2$X, —F, —Cl, —NCO, —COX, —CO$_2$R or SO$_2$R, where R is alkyl and X is fluorine or chlorine, with the proviso that both A and B are not —H.

In the case of tri-substituted phenyl groups (i.e., $C_6H_3$), such reactive compounds are typically substituted at the 1,3,5-positions. Also, where the possibility exists that a functional group in the reactive end group, other than the vinyl group, may react with the free radical of the growing macromonomer chain, such undesired reactive functionality can be readily modified to avoid this competitive reaction. For example, where the reactive intermediate contains a hydroxyl group, such a functionality may interfere with the desired reactivity of the vinyl group. In this case, the hydroxyl group functionality can be modified to, for example, the phenoxy salt, to eliminate this undesired reactivity.

By reacting the macromonomer with one of the above reactive compounds, a reactive terminus is added to the macromonomer. This reactive terminus may then participate in the copolymerization reaction forming the polymeric backbone. In this manner, the pendent macromonomers are covalently bonded to the polymeric backbone during synthesis of the backbone itself. In an alternative embodiment, the macromonomers are covalently bonded to the polymeric backbone subsequent to its creation as a bulk polymer or copolymer. In this embodiment, the reactive terminus may be used as a linker to covalently attach the macromonomer to an appropriate reactive site on the polymeric backbone. Alternatively, the reactive terminus may polymerize with the reactive terminus of other macromonomers to form the backbone.

In one embodiment of this invention the ion-exchange materials are in the form of membranes, and serve as electrolytes in a fuel cell. In this embodiment, the ion-exchange materials preferably conduct protons and are commonly referred to as proton-exchange membrane, or PEMs. In other embodiments, the PEM can be interposed between and bonded to electrode layers (e.g., the cathode and anode), the side of each electrode facing the PEM being in contact with a catalyst layer, such as, for example, a platinum, platinum alloy, supported platinum, or supported platinum alloy catalyst. The catalyst layer may be applied to the membrane or to the electrode surface. Such an assembly—that is, anode/PEM/cathode—is referred to as a membrane electrode assembly, or MEA. One method for forming the MEA involves spraying, or otherwise applying to the electrodes, a solution of ion-exchange material that is the same as, or different from, the ion-exchange material of the PEM. This ion-exchange material is typically applied to the catalyst-side of each electrode, with the PEM sandwiched between the two electrodes such that the side of the electrode to which the ion-exchange material has been applied is in contact with the PEM. A compressive force is then applied, typically in conjunction with heat, to form the MEA. In further embodiments, fuel cells are disclosed that incorporate such a PEM and/or MEA, and such fuel cells may be combined to form a fuel cell stack. In this regard, a variety of known techniques may be employed to make MEAs using the ion-exchange material of this invention.

In another embodiment, the ion-exchange materials of this invention comprise a plurality of macromonomers of differing uniform chain lengths. For example, the plurality of macromonomers may comprise a first portion and a second portion, wherein the number of monomer repeat units of the first portion are uniform about a given number, such as 32, and the number of monomer repeat units comprised in the macromonomers of the second portion are uniform about a different number, such as 62. As will be shown below, the water content and, thus, the ionic conductivity of the ion-exchange materials of this invention is a function of the macromonomer chain-length. Ionic conductivity is also a function of operating temperature. Therefore, such blended ion-exchange materials provide effective fuel cell performance over a range of operating temperatures, such as, for example, 40° C. to 200° C.

In another embodiment, the ion-exchange material of this invention is cross-linked. More specifically, the polymeric backbones may be cross-linked, or the macromonomers may be cross-linked, or both the polymeric backbones and the macromonomers may be cross-linked. Such cross-linking may be achieved by methods well known in the art. For example, the macromonomers can be cross-linked by incorporating reactive moieties in the phenyl rings of at least a portion of the monomer repeat units of the macromonomers, wherein the reactive moieties bond with the reactive moieties of adjacent macromonomers. The polymeric backbones may be cross-linked by reaction with a compound, such as DVB, having two reactive groups.

Another embodiment is directed to ion-exchange membranes that comprise a porous polymer substrate interpenetrated with the ion-exchange material of this invention using porous polymer substrates and methods disclosed in, for example, WO 00/22684. The porous polymer substrate is selected to provide desired mechanical, thermal, chemical, and oxidative stability to the membrane.

Additional embodiments of this invention include processes for the synthesis of the macromonomers described above via a stable free radical polymerization method. The focus of these processes is the synthesis of macromonomers that are uniform with respect to the number of monomer repeat units. A macromonomer synthesis wherein the macromonomers have a narrow molecular weight distribution has, by definition, a polydispersity close to unity (i.e., 1.0). Processes to synthesize polymers having relatively narrow polydispersities are disclosed in U.S. Pat. No. 4,581,429, which is directed to free radical polymerization utilizing certain initiators. Also, U.S. Pat. Nos. 5,322,912 and 5,449,724 are directed to stable free radical polymerization to produce polymers, such as polyethylene, having polydispersities close to unity, where both a stable free radical agent and a free radical initiator are used for the polymerization.

In the processes of this invention for the synthesis of styrenic or fluorinated styrenic macromonomers of a desired and uniform length, one or more styrenic or fluorinated styrenic monomers, dissolved in a suitable solvent, are combined with one or more free radical initiators and a stable free radical agent. The stable free radical agent is added first and reversibly bonds to the one or more monomers or to the monomer radical. The agent only allows other monomers to react with and add to the monomer or growing chain of monomers that it "protects." Free radical initiators are introduced at a lower temperature, such that they cannot react with the "protected" monomers. Polymerization does not take place until the temperature of the mixture exceeds a certain value, typically about 100° C. Any one or more of a variety of stable free radical agents and initiators may be used in this regard, such as those disclosed in U.S. Pat. No. 5,449,724. Further, any solvent able to solubilize the reaction components can be used, provided it is non-reactive to those components, and can withstand and maintain the desired reaction temperatures. In one embodiment, this reaction is allowed to go to completion. The macromonomers are then end-capped using any one of the reactive terminus agents disclosed above, and the macromonomer product, having the reactive terminus covalently bonded to one end, is then separated from the reaction mixture.

In a more specific embodiment, sodium styrene sulfonate monomer, in ethylene glycol solvent, is combined with 2,2,6,6-tetramethyl-1-piperidinoxy (TEMPO) as the stable free radical agent. Free radical initiators, $Na_2S_2O_5$ and $K_2S_2O_8$, are added to the mixture when its temperature has reached about 60° C. The mixture is then heated to 120° C.–125° C. to carry out the polymerization. Finally, divinylbenzene (DVB) is added to the mixture and provides a reactive terminus for each of the macromonomer chains, allowing the latter to participate in subsequent copolymerization or grafting reactions. By this process, macromonomers having substantially uniform chain-lengths may be synthesized.

In an alternative embodiment, the same technique as describe above can be used, except that the styrenic monomer is, for example, the potassium or sodium salt of $\alpha,\beta,\beta$-trifluorostyrene sulfonate. The residual carbon-carbon double bond of the DVB terminus provides the chemically-reactive means for copolymerizing the macromonomer with a monomer or monomers, or grafting, via covalent bonding, the macromonomer to a polymeric backbone that is a bulk polymer or copolymer.

In the above embodiments, the uniformity of macromonomer chain lengths largely results from using a stable free radical agent. The chain length itself is a function of the relative amounts of the one or more styrenic or fluorinated styrenic monomers and the one or more free radical initiators selected. As an example, when a batch of styrenic macromonomers is prepared according the above process, where the average number of monomer repeat units per macromonomer chain is 30, the macromonomer chain length may vary from about 28 to about 32. The charged groups are typically covalently bonded to the styrenic or fluorinated styrenic monomers used to synthesize the macromonomers before synthesis of the macromonomers.

Further embodiments are directed to processes for the synthesis of ion-exchange materials by the reaction of the styrenic or fluorinated styrenic macromonomers with one or more backbone monomers, or with a polymeric backbone that is a bulk polymer or copolymer, or with itself, according to four basic processes, the first step of each process being one of the processes described above for the synthesis of the macromonomers.

Figure 1:
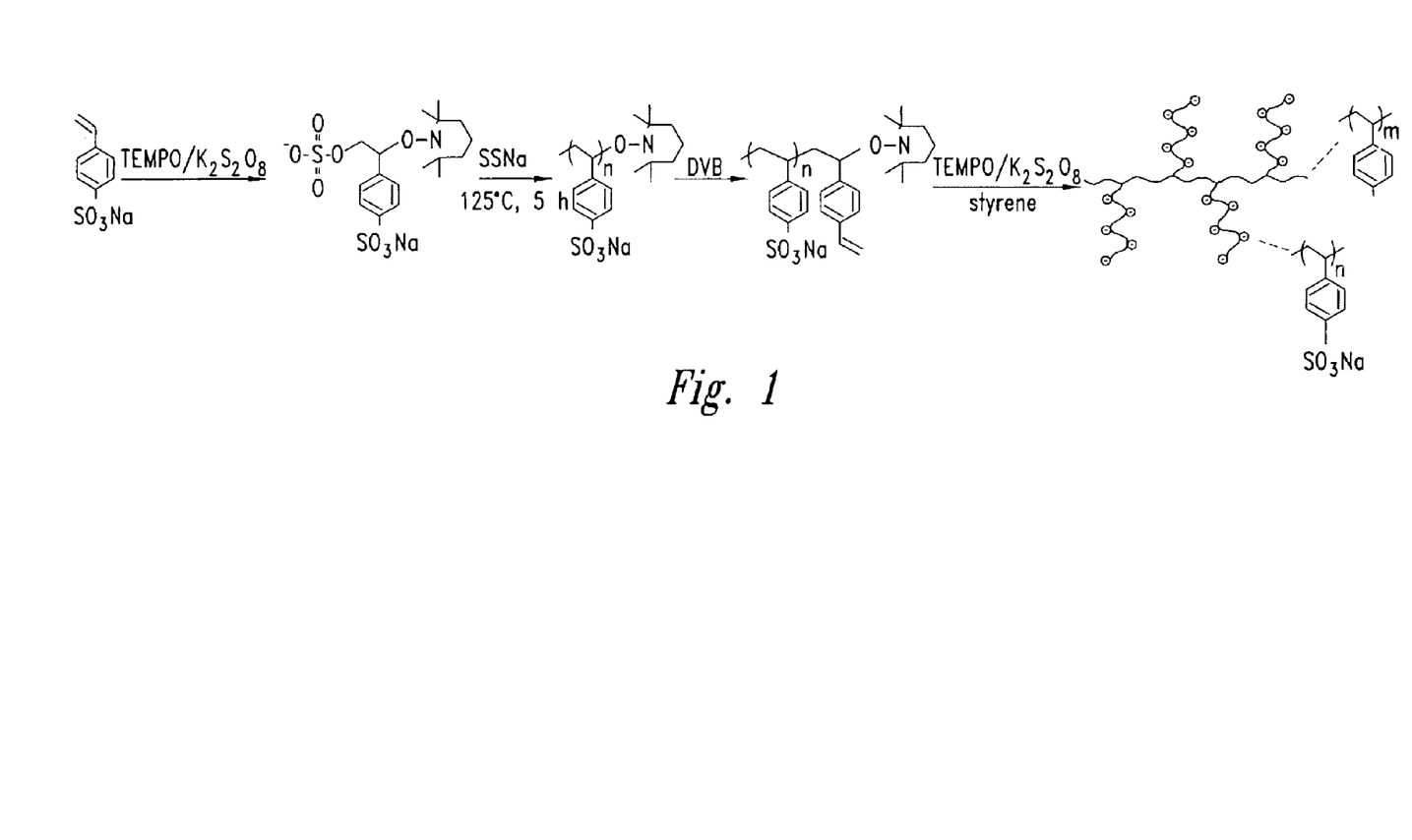
FIG. 1 illustrates synthesis of a representative ion-exchange material from sodium styrene sulfonate (SSNa) monomer via a stable free radical polymerization process to yield macromonomers, followed by adding divinylbenzene (DVB) as a reactive terminus, followed by copolymerization of the macromonomers with styrene to give a representative ion-exchange material.

(1) The first representative process comprises, as its second step, the copolymerization of the macromonomer with a backbone monomer or monomers. Various techniques that may be used in this regard (see, e.g., M. Maniruzzaman et al., *Macromolecules* 33, 1583–1592, 2000). In one embodiment a styrenic macromonomer, comprising a divinylbenzene (DVB) reactive terminus, is emulsion copolymerized with styrene monomer. FIG. 1 illustrates the synthesis of a representative macromonomer using sodium styrene sulfonate, followed by addition of DVB as a reactive terminus to the macromonomer, and the subsequent copolymerization of the macromonomer with styrene monomer. Control of the density of macromonomers in the copolymer and, thus, in this case, of the ionic content of the copolymer, is achieved by adjusting the feed ratio of macromonomer to monomer in the polymerization reaction and/or controlling the addition of the macromonomer to the monomer or vice versa. Ion-exchange materials synthesized by the above process have a controlled ionic content and comprise pendent styrenic macromonomers that are uniform with respect to the number of their monomer repeat units.

The same process may be used where other monomers and other styrenic or fluorinated styrenic macromonomers are copolymerized. When this first process is used, the styrenic macromonomers comprise a reactive terminus such as DVB. Charged groups (or precursors thereof, such as —$SO_2F$ or —$NO_2$) are typically covalently bonded to the monomer repeat units before synthesis of the ion-exchange material. Also, where a precursor to an acidic or basic group is used, it may be converted to the corresponding acidic or basic group after the polymerization.

(2) The second representative process comprises, as its second step, grafting, via covalent bonding, the styrenic or fluorinated styrenic macromonomers to a polymeric backbone that is a bulk polymer or copolymer, and that comprises reactive sites provided by irradiation of the backbone material (see, e.g., U.S. Pat. Nos. 4,012,303 and 4,605,685). Any irradiation method capable of introducing an acceptable density of reactive sites into the polymeric backbone may be used. For example, the irradiation may be by gamma rays, X-rays, or electron beam. Electron beam irradiation is advantageous as the process times are short and thus more suited to high volume production processes. Also, it may be desirable to irradiate the polymeric backbone prior to contacting it with the styrenic or fluorinated styrenic macromonomer. Once again, to facilitate grafting of the macromonomer throughout the volume of the backbone, the backbone may be contacted with a solution of the macromonomer, where a solvent is selected that will penetrate the backbone and cause it to swell. When this second method is used, the styrenic or fluorinated styrenic macromonomers need not necessarily comprise a reactive terminus such as DVB.

(3) The third representative process comprises, as its second step, grafting, via covalent bonding, the styrenic or fluorinated styrenic macromonomers to a polymeric backbone that is a bulk polymer or copolymer, and that comprises reactive sites provided by reactive groups, covalently-bonded thereto, or by chemical activation or treatment of the backbone. Methods for providing the reactive groups or providing reactive sites by chemical activation or treatment are well known in the art. For example, free radicals can effect hydrogen abstraction from polymers to yield reactive sites. Methacrylic or acrylic polymers or copolymers may be treated with phosphorus pentachloride, then reacted with a hydroperoxide to form a perester. The latter decomposes to provide free radical sites for grafting (see, e.g., U.S. Pat. No. 4,581,429). Functional groups may be provided in the polymeric backbone as, for example, precursor groups already present as substituents in the monomer or monomers polymerized to form the backbone. Reactive sites can then be created by post-reaction (i.e., after formation of the synthesis of the polymeric backbone) of the precursor groups to create, for example, unsaturated carbon-carbon bonds. Such a method allows a spatially ordered incorporation of reactive sites in the polymeric backbone. For example, if the polymeric backbone comprises suitable functional groups, such as hydroxyl groups, a redox system (e.g., $Fe^{+2}/H_2O_2$) can be used to yield reactive sites. As another example, if a monomer comprising isopropyl groups is introduced into or pre-exists in the polymer, direct peroxidation can then provide reactive sites for grafting (see, e.g., U.S. Pat. No. 4,581,429). Alternatively, reactive sites may be provided by chemically-reactive functional groups that are introduced into or pre-exist in the polymeric backbone by post-reaction of the backbone with suitable chemical agents. For example, hydroxyl groups introduced into the polymeric backbone can react with a carboxyl group at an end of a macromonomer to form an ester linkage. Such methods may result in a more spatially random positioning of reactive sites throughout the volume of the backbone.

Therefore, depending upon which of the above approaches is used, an ion-exchange material may be synthesized that comprises a plurality of pendent macromonomers located throughout the backbone in a spatially ordered or random fashion. For either approach, the polymeric backbone is usually contacted with a solution of the macromonomer, where a solvent is selected that will penetrate the backbone and cause it to swell. This facilitates grafting of the macromonomer throughout the volume of the backbone. More extensive grafting may also be facilitated by having the polymeric backbone in solution when it is a bulk polymer or copolymer.

(4) The fourth representative process comprises, as its second step, reacting the styrenic or fluorinated styrenic macromonomers to form a polymeric backbone. In this process, a portion of the macromonomer polymerizes with corresponding portions of other macromonomers to form the backbone. This may be accomplished, for example, by polymerization of a reactive end group of the styrenic or fluorinated styrenic macromonomer.

The following examples are provided for purpose of illustration, not limitation.

EXAMPLE 1

Syntheses of Representative Ion-exchange Material from Styrene Monomer and Sodium Styrene Sulfonate Macromonomer with a DVB Terminus Step 1: Synthesis of Sodium Styrene Sulfonate Macromonomers Comprising a DVB Terminus (macSSNa-DVB) By Stable Free Radical Polymerization A 1 L round-bottom flask equipped with a reflux condenser was charged with ethylene glycol (EG), sodium styrene sulfonate (SSNa), and 2,2,6,6-tetramethyl-1-piperidinyloxy (TEMPO). $K_2S_2O_8$ and $Na_2S_2O_5$ dissolved in $H_2O$ were added, the system was purged with $O_2$-free $N_2$, and heated to 60° C. with stirring for 1 hr. The solution was heated further to reflux (120–125° C.) for 5 hr after which divinylbenzene (DVB) (9 ml, 63 mmol) was injected into the solution and the mixture refluxed for an additional 15–20 min. The solution was cooled to room temperature and centrifuged. A top layer of unreacted DVB and precipitated solid salts (products of initiation) were removed. The solution was poured into diethyl ether/methanol (60/40 vol %) with stirring to precipitate the macromonomer. After filtration the macromonomer was dried under vacuum at room temperature for 1 day. No significant change in molecular weight or polydispersity of the macromonomer was observed after addition of the above-indicated quantity of DVB.

The number of SSNa monomer repeat units in the macromonomer product was controlled by the molar ratio of radical adduct to monomer. A particular SSNa macromonomer may be characterized by its number of monomer repeat units (n), and is referred to herein as macSSNa(n). After addition of DVB, such macromonomers are referred to herein as macSSNa-DVB(n). Four different macromonomer products were synthesized by the above process, corresponding to n=17, 29, 62, and 102. The amounts of reagents used to synthesize these products are shown in Table 1 below.

TABLE 1

Reaction Conditions for the Preparation of macSSNa-DVB(n)

| | macSSNa-DVB(n) | | | |
|---|---|---|---|---|
| n | 17 | 29 | 62 | 102 |
| mol. wt. | 4170 | 7670 | 16500 | 26250 |
| SSNa (g) | 60.0 | 80.0 | 80.0 | 80.0 |
| TEMPO (g) | 9.000 | 6.082 | 3.072 | 1.48 |
| $Na_2S_2O_5$ (g) | 4.100 | 2.733 | 1.367 | 0.688 |
| $K_2S_2O_8$ (g) | 7.776 | 5.184 | 2.593 | 1.292 |
| EG (ml) | 600 | 400 | 200 | 200 |
| $H_2O$ (ml) | 180 | 120 | 60 | 60 |
| DVB (ml) | 32 | 30 | 15 | 12 |
| Time (h)[1] | 4.0 | 5.0 | 6.0 | 6.0 |
| Yield[2] | 78% | 76% | 85% | 94% |

[1]Polymerization time for macSSNa.
[2]Based on SSNa.

Step 2: Copolymerization of macSSNa-DVB(n) with Styrene

Emulsion copolymerization of styrene with macSSNa-DVB(n) for n=17, 29, 62, and 102 was carried out at 60° C. in a mixture of deionized $H_2O$ and EG. A typical procedure was as follows: a particular macSSNa-DVB(n) macromonomer (6.0 g) was dissolved in a mixture of 20 ml EG and 3 ml $H_2O$. The system was purged with $N_2$. To obtain copolymers with different sulfonate contents, the amount of macromonomer added was varied between 6.0 and 2.0 g, and the amount of styrene added was varied between 4.0 and 8.0 ml. The solution was heated to 60° C., and 60 mg $K_2S_2O_8$ in 3.0 ml $H_2O$ were injected to initiate polymerization. The solution was stirred at 60° C. for 3.5 hr and 70° C. for 0.5 hr. The copolymer was precipitated into 60/40 vol % diethyl ether/methanol, collected by filtration, and air-dried. The crude product was extracted first with hot water and then with tetrahydrofuran (THF). The copolymer was finally dried under vacuum.

The sodium (Na) form of a copolymeric ion-exchange material having a polystyrene backbone (PS) is designated PS-macSSNa-DVB(n). Synthesis of PS-macSSNa-DVB(n) by the above-described two step process is depicted in FIG. 1. For comparative purposes, random copolymers of styrene and sodium styrene sulfonate (PS-r-SSNa) were also prepared using a conventional emulsion copolymerization as described by Weiss et al. (*J. Polym. Sci. Polym. Chem. Ed.* 23:525, 1985).

EXAMPLE 2

Characterization of macSSNa(n) and macSSNa-DVB(n)

Molecular weights of macSSNa(n) and macSSNa-DVB(n) were estimated by gel permeation chromatography (GPC, Waters, Model M-45) equipped with four ultrahydrogel columns. The eluant was 0.2 M $NaNO_3$ and 0.01 M $Na_2HPO_4$ in a mixture of acetonitrile/water (20:80 v/v) and the elution rate was 1 ml/min. The columns were calibrated by macSSNa(n) standards (Polysciences).

GPC analysis of macSSNa(n) products prior to addition of the DVB terminus showed single narrow peaks for each of four products (n=17, 29, 62, 102). Molecular weight data for these products are shown in Table 2. Polydispersities of 1.2–1.3 are consistent with a stable free radical polymerization. Molecular weights increase with the increasing monomer to initiator (radical adduct) ratio.

TABLE 2

Characterization of macSSNa(n)

| n | $M_W$[a] | $M_N$[b] | PD[c] | <DP>[d] |
|---|---|---|---|---|
| 17 | 4170 | 3500 | 1.19 | 17 |
| 29 | 7670 | 5900 | 1.30 | 29 |
| 62 | 16500 | 12700 | 1.29 | 62 |
| 102 | 26250 | 21000 | 1.25 | 102 |

[a]weight average molecular weight
[b]number average molecular weight
[c]polydispersity
[d]degree of polymerization GPC curves of macSSNa-DVB(n) also showed narrow peaks for each of the sample products. The molecular weights and values for polydispersity were virtually identical to the corresponding parent macromonomer prior to addition of DVB.

EXAMPLE 3

Preparation of PS-macSSNa-DVB(32)

PS-macSSNa-DVB(32) was prepared according to the procedures set forth in Example 1. Specifically, the sodium styrene sulfonate macromonomer, mac SSNa(32), was prepared and DVB added thereto to yield macSSNa-DVB(32). This macromonomer was then copolymerized with styrene to give PS-macSSNa-DVB(32). EXAMPLE 4

Preparation of PEMs from the PS-macSSNa-DVB (n) and PS-r-SSNa

Proton-exchange membranes (PEMs) were prepared by compression molding PS-macSSNa-DVB(n) or PS-r-SSNa at 230° C., followed by sodium ion exchange for protons by soaking the resulting membranes in 0.5 M $H_2SO_4$ for 2 days, followed by rinsing, and immersion in deionized water. Protonic forms of the resulting copolymers are referred to herein as PS-macSSA-DVB(n) and PS-r-SSA, respectively (where "A" refers to acid). Equivalent weights (EW) of the protonated membranes (g polymer/equiv $SO_3$) were determined by titration. EW values were in excellent agreement with those determined by IR analysis indicating that all ions in the membrane are accessible to aqueous solution.

EXAMPLE 5

Characterization of PS-macSSA-DVB(n) and PS-r-SSA Protonated Copolymer Membranes Ionic Content, Water Uptake/Content and Equivalent Weight (EW)

Infra-red spectra of the copolymers exhibited peaks at 1010 cm$^{-1}$, assigned to in-plane bending of the para-substituted benzene ring, and 1453 cm$^{-1}$ attributed to stretching vibrations of the unsubstituted phenyl ring. These were used to determine compositions of the copolymers (i.e., mol % SSNa) through calibration with values of sulfur content obtained by elemental analysis. Membranes were prepared as disclosed in Example 4 for PS-macSSA-DVB (n), where n=17, 29, 32, 62, and 102, and PS-r-SSA. The membranes were pat-dried and their mass determined. Thicknesses were measured using a digital micrometer (Mitutoyo). To obtain dry membranes, samples were placed under vacuum at 80° C. and dried to constant weight. Ionic contents, water contents, and the molar ratio of water to sulfonic acid groups ([H$_2$O]/[SO$_3^-$]) were determined at room temperature. Water contents were measured by soaking the membranes in aqueous sulfuric acid for 48 hrs at room temperature to ensure complete protonation, and then stored in Milli-Q water for at least 24 hrs at room temperature prior to testing. Test membranes, in the form of discs with a diameter of 1.55 cm, were pat-dried to eliminate surface water and quickly weighed on a Sartorius Basic BA210S balance (sensitivity of 0.1 mg). Multiple discs were measured to obtain an average value. Membranes were dried under vacuum for 3 hrs at 80° C. and cooled in a desiccator before obtaining dry weights. The membrane dimensions were measured with vernier calipers and a digital micrometer. Water contents are expressed as Vol % (100×Vol$_{Water}$/Vol$_{Wet\ Membrane}$) and as Wt % (100×Wt$_{Water}$/Wt$_{Wet\ Membrane}$). The results of these measurements are presented in Table 3.

For PS-macSSA-DVB(n) membranes, the [H$_2$O]/[SO$_3^-$] ratio increases gradually (~12–17 H$_2$O molecules per SO$_3$ site) as a function of ionic content at room temperature. The relatively low value of [H$_2$O]/[SO$_3^-$] indicates that the elastic forces in the novel copolymeric ion-exchange materials are quite large compared to the osmotic forces, even though ionic contents for some synthesized products are high. In contrast, the [H$_2$O]/[SO$_3^-$] ratio increases dramatically in the comparative random copolymer membranes over a similar range of ionic content. This indicates that the cohesive interactions of the hydrophobic polystyrene chains in the random copolymer membranes are much weaker, which is believed to be due to the presence of interspersed ionic groups.

As shown in Table 3, the water content of the PS-macSSA-DVB(n) membranes increases with increasing ionic content due to the increasing osmotic pressure. However, the rate of increase of water uptake correlates with the length of the macromonomer side chain. That is, above ~10 mol % SSNa, the shorter the ionic side chain, the lower the water content. Similarly, the [H$_2$O]/[SO$_3^-$] ratio for the PS-macSSA-DVB membranes increases (4–22 H$_2$O molecules per SO$_3^-$ site) as a function of ionic content, and as a function of the side chain-length.

The equivalent weight of the membranes was determined by titration. Three samples of each pretreated membrane (acidic form) were individually immersed in 50 ml 2.0 M NaCl solutions for 2 hours with occasional agitation. The solutions were titrated with 0.025 M NaOH to a phenolphthalein end-point. After titration, the sample was rinsed with distilled water and dried under vacuum at 80° C. to constant weight. The equivalent weight (EW) was calculated according to: EW=W$_S$/(V$_{NaOH}$×C$_{NaOH}$), where W$_s$ is the dry weight (g) of the sample, V$_{NaOH}$ and C$_{NaOH}$ are the volume (in liters) and molar concentration of NaOH solution consumed in titration. Equivalent weights are also presented in Tables 3.

Determination of EW by titration depends on both the ionic content of the membrane and the ability of the membrane to exchange ions, which in turn is determined by the accessibility of ionic sites to solution. EW data determined by IR analysis was compared with that obtained by titration. General agreement exists for relatively high copolymer ionic content. However, for copolymer membranes possessing EW values >1200 g/mol, EW determined by titration is greater and the discrepancy increases with increasing EW. The titration method is believed to overestimate the EW for high EW samples when the ionic content is low since a portion of the sulfonate sites are inaccessible to titration because a hydrophobic matrix isolates them.

TABLE 3

Characterization or PS-macSSA-DVB(n) and PS-r-SSA Protonated Copolymer Membranes

| Copolymer | SSA %$^a$ | EW (IR) (g/mol) | EW (Titr) (g/mol) | H$_2$O % (Wt.) | H$_2$O % (vol.) | [H$_2$O]/ [SO$_3$] | σ (Ω$^{-1}$ cm$^{-1}$) |
|---|---|---|---|---|---|---|---|
| PS-macSSA-DVB (17) | 17.7 | 689 | 764 | 22 | 22 | 11 | 0.076 |
|  | 14.2 | 835 | 857 | 21 | 17 | 13 | 0.054 |
|  | 12.6 | 931 | 1010 | 14 | 15 | 9 | 0.038 |
|  | 9.9 | 1150 | 1210 | 11 | 9 | 8 | 0.018 |
|  | 9.2 | 1239 | 1340 | 10 | 11 | 8 | 0.015 |
|  | 7.8 | 1433 | 2530 | 6 | 5 | 6 | 0.01 |
|  | 7.2 | 1541 | 15000 | 5 | 3 | 4 | — |
| PS-macSSA-DVB (29) | 18.9 | 654 | 595 | 34 | 37 | 19 | 0.153 |
|  | 17.2 | 706 | 664 | 32 | 37 | 18 | 0.094 |
|  | 14.7 | 809 | 775 | 21 | 21 | 12 | 0.045 |
|  | 11.2 | 1035 | 990 | 15 | 18 | 10 | 0.015 |
|  | 9.9 | 1157 | 1240 | 11 | 9 | 8 | 0.009 |
|  | 7.3 | 1522 | 1610 | 9 | 11 | 8 | 0.003 |
|  | 7.4 | 1512 | 2940 | 6 | 7 | 6 | — |
| PS-macSSA-DVB (32) | 19.1 | 648 | 641 | — | 32.2 | 17.1 | 0.24 |
|  | 16.1 | 748 | 736 | — | 24.2 | 13.3 | 0.054 |
|  | 11.9 | 979 | 993 | — | 17.6 | 11.6 | 0.013 |
|  | 10.1 | 1127 | 1156 | — | 15.4 | 11.4 | 0.0069 |

TABLE 3-continued

Characterization or PS-macSSA-DVB(n) and PS-r-SSA Protonated Copolymer Membranes

| Copolymer | SSA %[a] | EW (IR) (g/mol) | EW (Titr) (g/mol) | $H_2O$ % (Wt.) | $H_2O$ % (vol.) | $[H_2O]/[SO_3]$ | $\sigma$ ($\Omega^{-1}$ cm$^{-1}$) |
|---|---|---|---|---|---|---|---|
| PS-macSSA-DVB (62) | 15.3 | 784 | 645 | 33 | 39 | 22 | 0.124 |
|  | 14.8 | 808 | 725 | 29 | 36 | 18 | 0.083 |
|  | 13.1 | 898 | 807 | 21 | 19 | 13 | 0.04 |
|  | 10.2 | 1125 | 2120 | 11 | 14 | 8 | 0.008 |
|  | 8.0 | 1409 | 1360 | 10 | 10 | 9 | 0.004 |
|  | 7.1 | 1566 | 18700 | 6 | 6 | 5 | — |
|  | 6.5 | 1709 | 100000 | 5 | 5 | 5 | — |
| PS-macSSA-DVB (102) | 16.1 | 747 | 672 | 26 | — | 14 | 0.2 |
|  | 13.2 | 887 | 866 | 17.6 | — | 11 | 0.01 |
|  | 10.9 | 1054 | 1075 | 14 | — | 10 | 0.0030 |
|  | 8.56 | 1318 | 21060 | 4 | — | 3 | — |
|  | 7.12 | 1566 | 36080 | 5 | — | 5 | 0.002 |
| PS-r-SSA | 16.8 | 721 | 811 | — | 40.5 | 27.2 | 0.0041 |
|  | 12.0 | 970 | 1067 | — | 24.2 | 17.2 | 0.0023 |
|  | 9.6 | 1291 | 1218 | — | 12.3 | 10.1 | 0.00058 |

2. Structure of Membranes Prepared from Ion-exchange Materials and from Random Copolymers Transmission electron microscopy (TEM) analysis was performed on $Pb^{+2}$-stained PS-macSSA-DVB(n) and PS-r-SSA membranes. Films were sandwiched between two polystyrene films and hot pressed. Samples fused between polystyrene films were sectioned along the normal direction to yield 40 nm thick slices using an ultramicrotome (Ultracut-E, Reichert-Jung).

Figure 2:
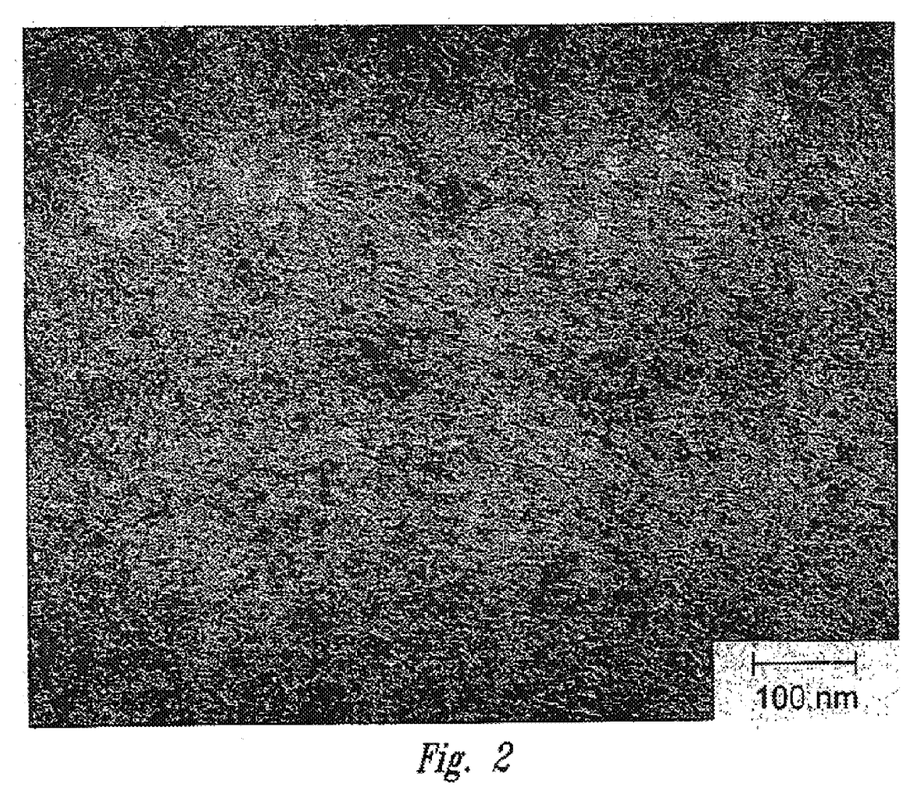
FIGS. 2, 3, 4 and 5 are micrographs of membranes prepared from PS-macSSA-DVB(21), PS-macSSA-DVB(32), PS-macSSA-DVB(102), and PS-r-SSA, respectively.
Figure 3:
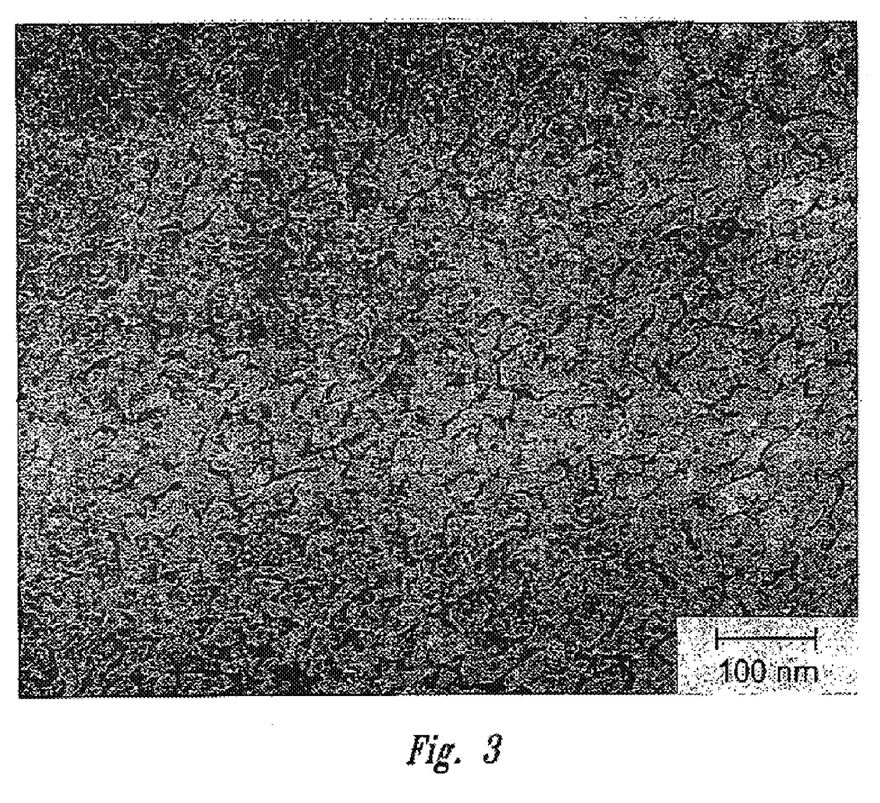
Figure 4:
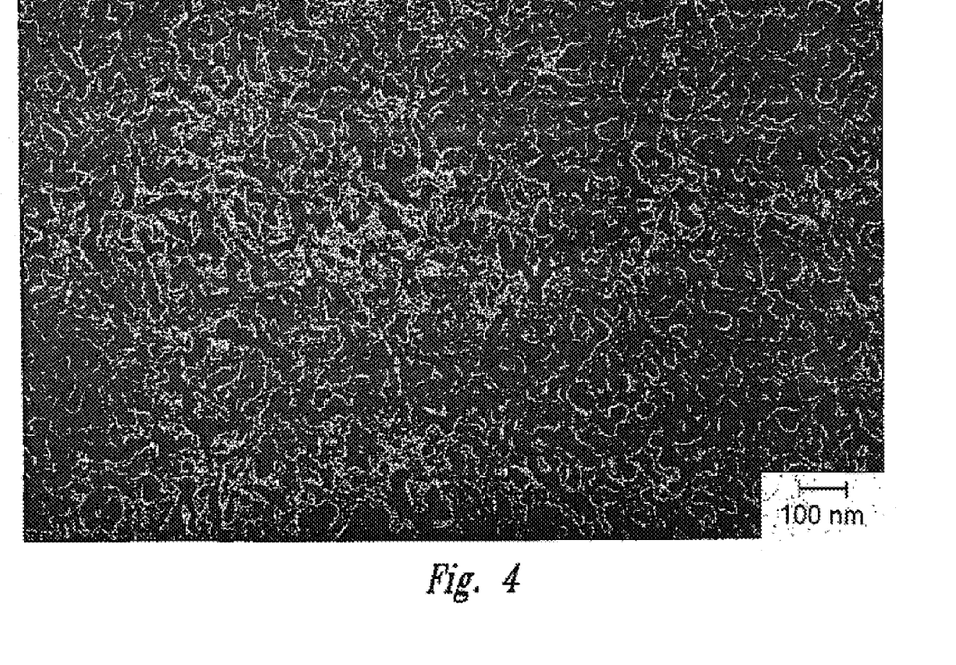

FIGS. 2, 3 and 4 show TEM micrographs of membranes having similar ion contents of 12.9 mol %, 11.9 mol %, and 13.2 mol %, respectively, and comprising macromonomers having short (n~21), medium (n~32) and long chains (n~102), respectively. The number of repeat units of the macromonomers comprised in the membrane shown in FIGS. 2 (n=21) is slightly different than the number of repeat units in the membrane of Table 3 (n=17). However, the morphology and properties of the membrane shown in FIG. 2, as well as for the membranes shown in FIGS. 3 and 4, are representative of membranes having short, medium and long chains. The dark regions of the micrographs represent localization of the ion domains while the lighter regions represent hydrophobic polystyrene domains.

All three micrographs evidence biphasic morphology. For a particular PS-macSSA-DVB(n), the fraction of ionic domains and the connectivity of ionic domains increases with increasing ionic content. However, there are distinct differences between the three PS-macSSA-DVB(n) membranes. FIGS. 2–4 illustrate that for PS-macSSA-DVB(21) (short chain-length); the biphasic morphology is not as well developed as in the longer chain analogues. For the 8.1 mol % styrenesulfonate (mol % SSA) sample, no clear separation of ionic domains was observed. Connectivity of ion domains is greater in the 12.9 and 16.6 mol % samples, but phase separation is still only relatively moderate compared to membranes possessing longer macromonomers.

A biphasic morphology is more pronounced with increasing macromonomer chain-length. For PS-macSSA-DVB (102), individual spherical ionic domains can be observed for membranes containing 8.6% mol SSA. For the 10.9 mol % ion-containing membrane, ionic domains were much larger but still largely isolated. As the ionic content is increased further to 13.2 mol %, the ion domains coalesce to form a more continuous biphasic ionic network.

The TEM micrographs of PS-macSSA-DVB(32) membranes also show a biphasic morphology. The sample with the lowest ionic content (8.1 mol % SSA) was observed to possess a phase separated network. As the ionic content is increased, the density of the ionic connections increases. The degree of phase separation was observed to lie in between that for the short and long graft length membranes.

The differing degree of phase separation is attributed to the different macromonomer chain-lengths. For a given ionic content, the larger the macromonomer, the greater the separation between macromonomers on the backbone. For example, the average number of backbone styrenic repeat units that separate adjacent pendent macromonomers is calculated to be ~120 for PS-macSSNa-DVB(21) containing 15 SSA mol %. In contrast, the average number of backbone styrenic repeat units that separate adjacent pendent macromonomers is calculated to be ~580 for PS-macSSNa-DVB (102).

Figure 5:
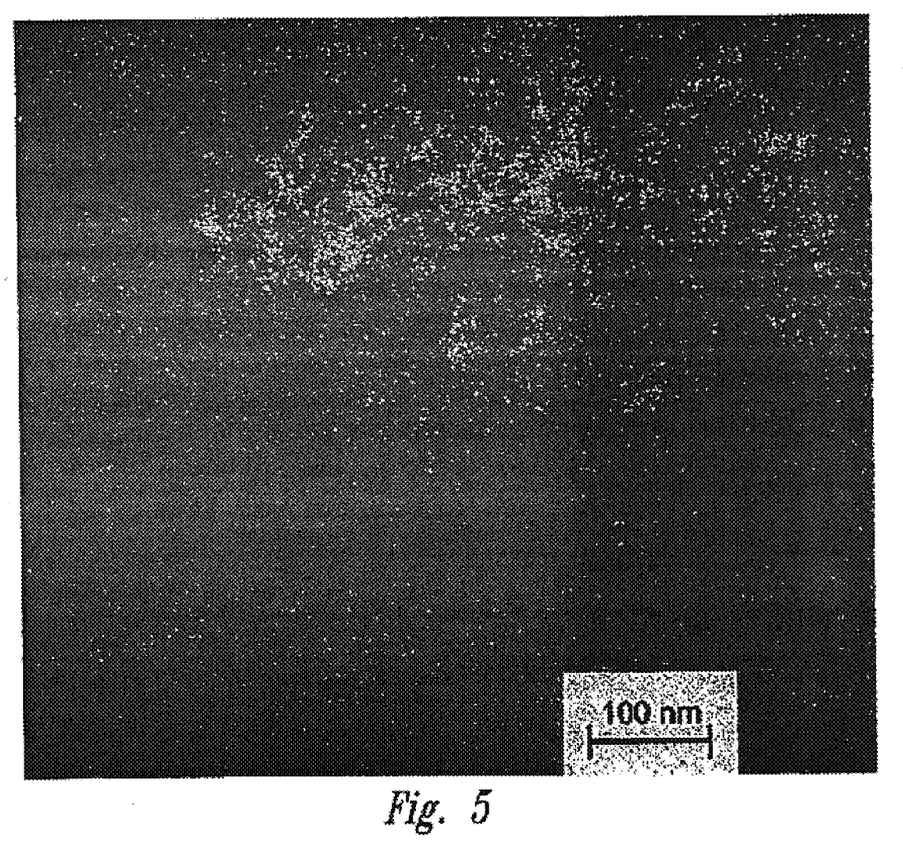

In contrast to the biphasic morphology observed, TEM micrographs of random copolymers of styrene and styrene sulfonate are featureless. FIG. 5 shows a typical micrograph of a PS-r-SSA membrane possessing an ion content (12 mol %) similar to the ion contents of the PS-macSSA-DVB membranes illustrated in FIGS. 2–4.

3. Conductivity of the Protonated Copolymer Membranes

Proton conductivities ($\sigma$), as listed in Table 3, were measured at room temperature by impedance spectroscopy in the frequency range of 100 Hz to 40 MHz as described by Gardner and Anantaraman (*J. Electroanal. Chem.* 395:67, 1995). A Hewlett Packard 4194-A Impedance Analyzer equipped with a 16047 Test Fixture was used in conjunction with a gold plated coaxial probe. The accuracy of the measurements was verified by obtaining conductivity values for Nafion® 117 (0.07–0.08 $\Omega^{-1}$cm$^{-1}$) which are consistent with published results.

The PS-macSSA-DVB(n) membranes exhibited a significantly higher conductivity than the PS-r-SSA membranes. In comparing a representative ion-exchange material of this invention to a membrane comprising a random copolymer, wherein the membranes have about 16.1 mol % and 16.8 mol % of styrene sulfonic acid, respectively, the conductivity of the inventive membranes are an order of magnitude higher, even though its water content was 60% lower. That is, PS-macSSA-DVB(n) membranes use their associated water more effectively in the transport of protons. For example, PS-macSSA-DVB(32) with 19.1 mol % SSA possesses a conductivity of 0.24 $\Omega^{-1}$cm$^{-1}$, yet comprises only 33 vol % water at room temperature. This conductivity is 3 to 5 times larger than Nafion 117 having a similar water content (Nafion 117 comprising 34 vol % $H_2O$ at room temperature).

For each of the membranes (n=17, 29, 32, 62, and 102) prepared, conductivity increases with ionic content. However, just as in the case of morphology and water sorption, there are characteristic differences between products of different macromonomer chain length. Membranes based on the shortest chain-length (n=17) exhibit a higher conductivity in the low ionic content regime. Conductivity in this regime decreases with increasing macromonomer chain-length. In contrast, conductivity decreases with decreasing macromonomer chain-length in the high ionic content regime.

Membranes having macromonomers with a long chain-length are phase separated to a greater extent than membranes having macromonomers with a shorter chain-lengths. Hence the "connectivity" of aqueous/ionic domains in the low ionic content regime is lower for membranes based on macromonomers of long chain-length. Consequently, conductivity is lower in the low ionic content regime for membranes having macromonomers with longer chain-lengths. With increasing ionic content, membranes imbibe sufficient water to form a continuous network, and phase separation now enhances connectivity of the aqueous/ionic domains because it serves to exclude non-conductive hydrophobic regions. Thus, in the higher ionic content regime, membranes based on macromonomers of longer chain-lengths exhibit higher conductivity than those based on macromonomers of shorter chain-length.

The above examples illustrate that controlling the number of monomer repeat units of the pendent macromonomers yields ion-exchange materials with hydrophobic and hydrophilic portions that, through phase separation, provide a network of ionic microchannels. These microchannels, when hydrated, facilitate the movement of ions and enhance ionic conductivity.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

From the foregoing, it will be appreciated that, although specific embodiments of this invention have been described herein for the purpose of illustration, various modifications may be made without departing from the spirit and scope of the invention. Accordingly, the invention is not limited except by the appended claims.

What is claimed is:

1. A proton-exchange membrane comprising an ion-exchange material having a polymeric backbone and a plurality of pendent styrenic or fluorinated styrenic macromonomers covalently bonded thereto, wherein the plurality of pendent styrenic or fluorinated styrenic macromonomers comprise a uniform number of styrenic or fluorinated styrenic monomer repeat units, and wherein predominantly all of the styrenic or fluorinated styrenic monomer repeat units have at least one acidic group.

2. The proton-exchange membrane of claim 1 wherein the polymeric backbone is formed by a copolymerization reaction between a monomer and the styrenic or fluorinated styrenic macromonomers.

3. The proton-exchange membrane of claim 2 wherein the monomer is styrene or fluorinated styrene.

4. The proton-exchange membrane of claim 1 wherein the polymeric backbone is formed as a bulk polymer or copolymer, prior to having the plurality of pendent styrenic or fluorinated styrenic macromonomers covalently bonded thereto.

5. The proton-exchange membrane of claim 1 wherein the plurality of pendent styrenic or fluorinated styrenic macromonomers is a plurality of styrenic macromonomers comprising a uniform number of styrenic monomer repeat units.

6. The proton-exchange membrane of claim 1 wherein the plurality of pendent styrenic or fluorinated styrenic macromonomers is a plurality of fluorinated styrenic macromonomers comprising a uniform number of fluorinated styrenic monomer repeat units.

7. The proton-exchange membrane of claim 1 wherein the plurality of pendent styrenic or fluorinated styrenic macromonomers comprises a plurality of styrenic macromonomers comprising a uniform number of styrenic monomer repeat units, and a plurality of fluorinated styrenic macromonomers comprising a uniform number of fluorinated styrenic monomer repeat units.

8. The proton-exchange membrane of claim 1 wherein the uniform number of styrenic or fluorinated styrenic monomer repeat units ranges from 10 to 150.

9. The proton-exchange membrane of claim 1 wherein the uniform number of styrenic or fluorinated styrenic monomer repeat units ranges from 10 to 49.

10. The proton-exchange membrane of claim 1 wherein the uniform number of styrenic or fluorinated styrenic monomer repeat units ranges from 50 to 99.

11. The proton-exchange membrane of claim 1 wherein the uniform number of styrenic or fluorinated styrenic monomer repeat units ranges from 20 to 40.

12. The proton-exchange membrane of claim 1 wherein the uniform number of styrenic or fluorinated styrenic monomer repeat units ranges from 100 to 150.

13. The proton-exchange membrane of claim 1 wherein the styrenic or fluorinated styrenic macromonomers, having a uniform number of styrenic or fluorinated styrenic monomer repeat units, have a polydispersity ranging from 1.0 to 1.4.

14. The proton-exchange membrane of claim 1 wherein the styrenic or fluorinated styrenic macromonomers having a uniform number of styrenic or fluorinated styrenic monomer repeat units have a polydispersity ranging from 1.05 to 1.3.

15. The proton-exchange membrane of claim 1 wherein in excess of 70% of the styrenic or fluorinated styrenic monomer repeat units have at least one acidic group.

16. The proton-exchange membrane of claim 1 wherein in excess of 80% of the styrenic or fluorinated styrenic monomer repeat units have at least one acidic group.

17. The proton-exchange membrane of claim 1 wherein in excess of 90% of the styrenic or fluorinated styrenic monomer repeat units have at least one acidic group.

18. The proton-exchange membrane of claim 1 wherein all of the styrenic or fluorinated styrenic monomer repeat units have at least one acidic group.

19. The proton-exchange membrane of claim 1 wherein the acidic-group is $-SO_3H$, $-PO_2H_2$, $-PO_3H_2$, $-CH_2PO_3H_2$, $-OSO_3H$, $-OPO_2H_2$, $-OPO_3H_2$, or a mixture thereof.

20. The proton-exchange membrane of claim 1 wherein the acidic group is $-SO_3H$.

21. The proton-exchange membrane of claim 1 wherein the acidic group is $-PO_3H_2$.

22. The proton-exchange membrane of claim 1 wherein the plurality of pendent styrenic or fluorinated styrenic macromonomers comprise at least a first portion and a second portion, wherein the first portion comprises a first uniform number of styrenic or fluorinated styrenic monomer repeat units, and the second portion comprises a second uniform number of the styrenic or fluorinated styrenic monomer repeat units, wherein the first uniform number and the second uniform number are different.

23. The proton-exchange membrane of claim 1 wherein at least a portion of the plurality of pendent styrenic or fluorinated styrenic macromonomers and at least a portion of the polymeric backbones are cross-linked.

24. The proton-exchange membrane of claim 1 wherein at least one surface of the membrane is in contact with a catalyst.

25. A membrane electrode assembly comprising a proton-exchange membrane of claim 1.

26. A fuel cell comprising a membrane electrode assembly of claim 25.

27. A fuel cell stack comprising a fuel cell of claim 26.

28. A method for making a plurality of styrenic or fluorinated styrenic macromonomers having a uniform number of styrenic or fluorinated styrenic monomer repeat units, comprising the steps of:
adding a free radical initiator into a mixture comprising styrenic or fluorinated styrenic monomers, a solvent and a stable free radical agent, wherein the mixture is at a first temperature sufficient to form an adduct between a portion of the styrenic or fluorinated styrenic monomers, the free radical initiator and the stable free radical agent;
polymerizing the adduct with the styrenic or fluorinated styrenic monomers at a second temperature greater than the first temperature, wherein the second temperature is sufficient to sustain polymerization, and thereby forming the plurality of styrenic or fluorinated styrenic macromonomers having the uniform number of styrenic or fluorinated styrenic monomer repeat units; and
adding a reactive end-group to the plurality of styrenic or fluorinated styrenic macromonomers having the uniform number of styrenic or fluorinated styrenic monomer repeat units,
wherein predominantly all of the styrenic or fluorinated styrenic monomers used in the polymerization step have at least one charged group.

29. The method of claim 28 wherein the step of polymerizing the adduct with the styrenic or fluorinated styrenic monomer goes to completion.

30. The method of claim 28 wherein the ratio of the concentration of the styrene or fluorinated styrene monomers to the concentration of the free radical initiator is selected so as to yield macromonomers having a desired chain-length.

31. The method of claim 28 further comprising the step of copolymerizing the plurality of styrenic or fluorinated styrenic macromonomers with a monomer to yield an ion-exchange material.

32. An ion-exchange material comprising a polymeric backbone and a plurality of pendent styrenic or fluorinated styrenic macromonomers covalently bonded thereto, wherein the plurality of pendent styrenic or fluorinated styrenic macromonomers comprise a uniform number of styrenic or fluorinated styrenic monomer repeat units, and wherein predominately all of the styrenic or fluorinated styrenic monomer repeat units have at least one charged group.

33. The ion-exchange material of claim 32 wherein the polymeric backbone is electron-conducting.

34. The ion-exchange material of claim 32 wherein the polymeric backbone comprises a porous inorganic polymer.

35. The ion-exchange material of claim 34 wherein the porous inorganic polymer is carbon or titanium dioxide.

36. The ion-exchange material of claim 35, wherein the carbon is graphite.

37. A method for making a plurality of styrenic or fluorinated styrenic macromonomers having a uniform number of styrenic or fluorinated styrenic monomer repeat units, comprising the steps of:
adding a free radical initiator into a mixture comprising styrenic or fluorinated styrenic monomers, a solvent and a stable free radical agent, wherein the mixture is at a first temperature sufficient to form an adduct between a portion of the styrenic or fluorinated styrenic monomers, the free radical initiator and the stable free radical agent;
polymerizing the adduct with the styrenic or fluorinated styrenic monomers at a second temperature greater than the first temperature, wherein the second temperature is sufficient to sustain polymerization, and thereby forming the plurality of styrenic or fluorinated styrenic macromonomers having the uniform number of styrenic or fluorinated styrenic monomer repeat units;
adding at least one charged group to predominately all of the styrenic or fluorinated styrenic monomer repeat units of the macromonomers after formation of the plurality of styrenic or fluorinated styrenic macromonomers; and
adding a reactive end-group to the plurality of styrenic or fluorinated styrenic macromonomers having the uniform number of styrenic or fluorinated styrenic monomer repeat units.

38. The method of claim 37 wherein the step of polymerizing the adduct with the styrenic or fluorinated styrenic monomer goes to completion.

39. The method of claim 37 wherein the ratio of the concentration of the styrene or fluorinated styrene monomers to the concentration of the free radical initiator is selected so as to yield macromonomers having a desired chain-length.

40. The method of claim 37 further comprising the step of copolymerizing the plurality of styrenic or fluorinated styrenic macromonomers with a monomer to yield an ion-exchange material.

41. A method for making a plurality of styrenic or fluorinated styrenic macromonomers having a uniform number of styrenic or fluorinated styrenic monomer repeat units, comprising the steps of:
adding a free radical initiator into a mixture comprising styrenic or fluorinated styrenic monomers, a solvent and a stable free radical agent, wherein the mixture is at a first temperature sufficient to form an adduct between a portion of the styrenic or fluorinated styrenic monomers, the free radical initiator and the stable free radical agent;
polymerizing the adduct with the styrenic or fluorinated styrenic monomers at a second temperature greater than the first temperature, wherein the second temperature is sufficient to sustain polymerization, and thereby forming the plurality of styrenic or fluorinated styrenic macromonomers having the uniform number of styrenic or fluorinated styrenic monomer repeat units;
adding a reactive end-group to the plurality of styrenic or fluorinated styrenic macromonomers having the uniform number of styrenic or fluorinated styrenic monomer repeat units;
copolymerizing the plurality of styrenic or fluorinated styrenic macromonomers with a monomer to yield an ion-exchange material; and adding at least one charged group to predominately all of the styrenic or fluorinated styrenic monomer repeat units of the macromonomers after formation of the ion-exchange material.

42. The method of claim 41 wherein the step of polymerizing the adduct with the styrenic or fluorinated styrenic monomer goes to completion.

43. The method of claim 41 wherein the ratio of the concentration of the styrene or fluorinated styrene monomers to the concentration of the free radical initiator is selected so as to yield macromonomers having a desired chain-length.

44. A method for making a plurality of styrenic or fluorinated styrenic macromonomers having a uniform number of styrenic or fluorinated styrenic monomer repeat units, comprising the steps of:

adding a free radical initiator into a mixture comprising styrenic or fluorinated styrenic monomers, a solvent and a stable free radical agent, wherein the mixture is at a first temperature sufficient to form an adduct between a portion of the styrenic or fluorinated styrenic monomers, the free radical initiator and the stable free radical agent;

polymerizing the adduct with the styrenic or fluorinated styrenic monomers at a second temperature greater than the first temperature, wherein the second temperature is sufficient to sustain polymerization, and thereby forming the plurality of styrenic or fluorinated styrenic macromonomers having the uniform number of styrenic or fluorinated styrenic monomer repeat units; and grafting the styrenic or fluorinated styrenic macromonomers to a polymeric backbone.

45. The method of claim 44 wherein the step of polymerizing the adduct with the styrenic or fluorinated styrenic monomer goes to completion.

46. The method of claim 44 wherein the ratio of the concentration of the styrene of fluorinated styrene monomers to the concentration of the free radical initiator is selected so as to yield macromonomers having a desired chain-length.

* * * * *